(12) United States Patent
Lee et al.

(10) Patent No.: US 7,619,694 B2
(45) Date of Patent: Nov. 17, 2009

(54) THIN FILM TRANSISTOR ARRAY PANEL AND MANUFACTURING METHOD THEREOF

(75) Inventors: Chang-Hun Lee, Yongin-si (KR); Hyun-Wuk Kim, Yongin-si (KR); Mee-Hye Jung, Hwaseong-si (KR); Kyoung-Ju Shin, Yongin-si (KR); Hak-Sun Chang, Yongin-si (KR); Yoon-Sung Um, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 625 days.

(21) Appl. No.: 11/246,461

(22) Filed: Oct. 6, 2005

(65) Prior Publication Data

US 2006/0087598 A1 Apr. 27, 2006

(30) Foreign Application Priority Data

Oct. 25, 2004 (KR) .................. 10-2004-0085325

(51) Int. Cl.
*G02F 1/1343* (2006.01)
(52) U.S. Cl. ................... 349/38; 349/43; 349/139; 349/144; 349/129
(58) Field of Classification Search ............ 349/38, 349/43, 139, 141, 143, 144, 41, 110, 129
See application file for complete search history.

(56) References Cited

U.S. PATENT DOCUMENTS

| 5,610,739 | A | 3/1997 | Uno et al. |
| 5,680,190 | A | 10/1997 | Michibayashi et al. |
| 2003/0197825 | A1 | 10/2003 | Lee et al. |
| 2004/0160560 | A1 | 8/2004 | Kim et al. |
| 2005/0280749 | A1* | 12/2005 | Jung et al. .................. 349/43 |

FOREIGN PATENT DOCUMENTS

JP 10-123482 5/1998

* cited by examiner

*Primary Examiner*—Thoi V Duong
(74) *Attorney, Agent, or Firm*—Innovation Counsel LLP

(57) ABSTRACT

A thin film transistor array panel according to an embodiment includes: a substrate; a plurality of gate line formed on the substrate; a plurality of first capacitor electrodes formed on the substrate and separated from the gate lines; a plurality of data line intersecting the gate lines; a plurality of thin film transistor connected to the gate lines and the data lines; a plurality of second capacitor electrodes disposed on the first electrode; a plurality of interconnections connected to the second capacitor electrodes and the thin film transistor and disposed symmetrical to the data lines; and a plurality of pixel electrode, each pixel electrode including a first subpixel electrode connected to one of the thin film transistors and a second subpixel electrode connected to one of the first capacitor electrodes.

20 Claims, 8 Drawing Sheets

THIN FILM TRANSISTOR ARRAY PANEL AND MANUFACTURING METHOD THEREOF

CROSS-REFERENCE TO RELATED APPLICATIONS

This application relies for priority upon Patent Application No. 10-2004-0085325 filed in the Korean Intellectual Property Office, Republic of Korea, on Oct. 25, 2004, the entire content of which is hereby incorporated herein by reference.

BACKGROUND OF THE INVENTION (a) Field of the Invention

The present invention relates to a thin film transistor array panel and a manufacturing method thereof.

(b) Description of the Related Art

A liquid crystal display (LCD) is one of the most widely used flat panel displays. An LCD typically includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust the polarization of the incident light.

Among the various types of LCDs, a vertical alignment (VA) mode LCD, which aligns LC molecules such that the long axes of the LC molecules are perpendicular to the panels in the absence of an electric -field, is noted because of its high contrast ratio and wide reference viewing angle. The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the reference viewing angle is widened. However, the VA mode LCD has poor lateral visibility as compared with front visibility. In the meantime, a data line for transmitting the field-generating electrodes and other conductors such as pixel electrodes adjacent thereto form parasitic capacitances. When the data line forms different parasitic capacitances with left and right pixel electrodes, the voltage variations of the pixel electrodes caused by the parasitic capacitances are different and thus stains are generated in a screen to degrade the image quality.

SUMMARY OF THE INVENTION

A thin film transistor array panel according to an embodiment of the present invention includes: a substrate; a gate line formed on the substrate; a first capacitor electrode formed on the substrate and separated from the gate line; a data line intersecting the gate line; a thin film transistor connected to the gate line and the data line; a second capacitor electrode disposed on the first capacitor electrode; a plurality of interconnections connected to the second capacitor electrode and the thin film transistor and disposed substantially symmetrical to the data line; and a pixel electrode including at least one first subpixel electrode connected to the thin film transistor and a second subpixel electrode connected to the first capacitor electrode. The distance between the interconnections and the data line may be smaller than about 42 microns.

The thin film transistor array panel may further include at least one structural member connected to the thin film transistor; and at least one storage electrode overlapping the at least one structural member. The at least one first subpixel electrode may include a third subpixel electrode and a fourth subpixel electrode. The at least one structural member may include first and second structural members connected to the third and the fourth subpixel electrodes, respectively, and disposed substantially symmetrical to a reference bisecting the pixel electrode and extending parallel to the gate line. The at least one storage electrode may include first and second storage electrodes overlapping the first and the second structural members, respectively, and disposed substantially symmetrical to the reference line. The interconnections or the pixel electrode may be disposed substantially symmetrical to the reference line. The second capacitor electrode may have a through-hole, and the second subpixel electrode and the first capacitor electrode may be connected to each other through the through-hole. The first capacitor electrode or the second capacitor electrode may be disposed substantially symmetrical to a reference line bisecting the pixel electrode and parallel to the gate line.

The thin film transistor array panel may further include a shielding electrode separated from the pixel electrode and overlapping the data line or the gate line at least in part. The pixel electrode and the shielding electrode may include the same layer. The shielding electrode may extend along the data line or the gate line and may fully cover the data line. The pixel electrode has a partitioning member for partitioning the pixel electrode. The partitioning member may be elongated with making an angle of about 45 degrees with the gate line.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
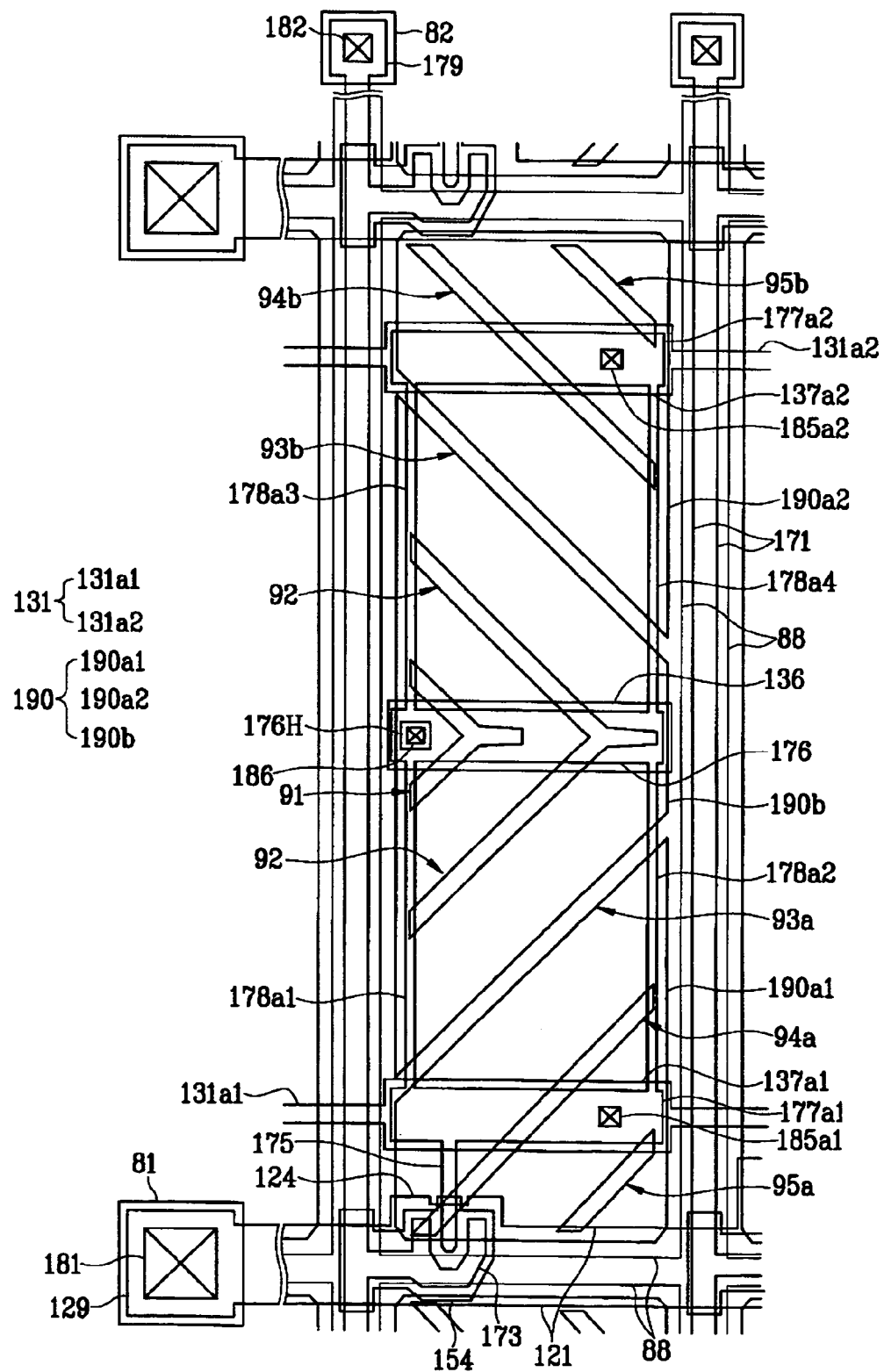
FIG. 1 is a layout view of a Thin Film Transistor (TFT) array panel of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein. In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Figure 2:
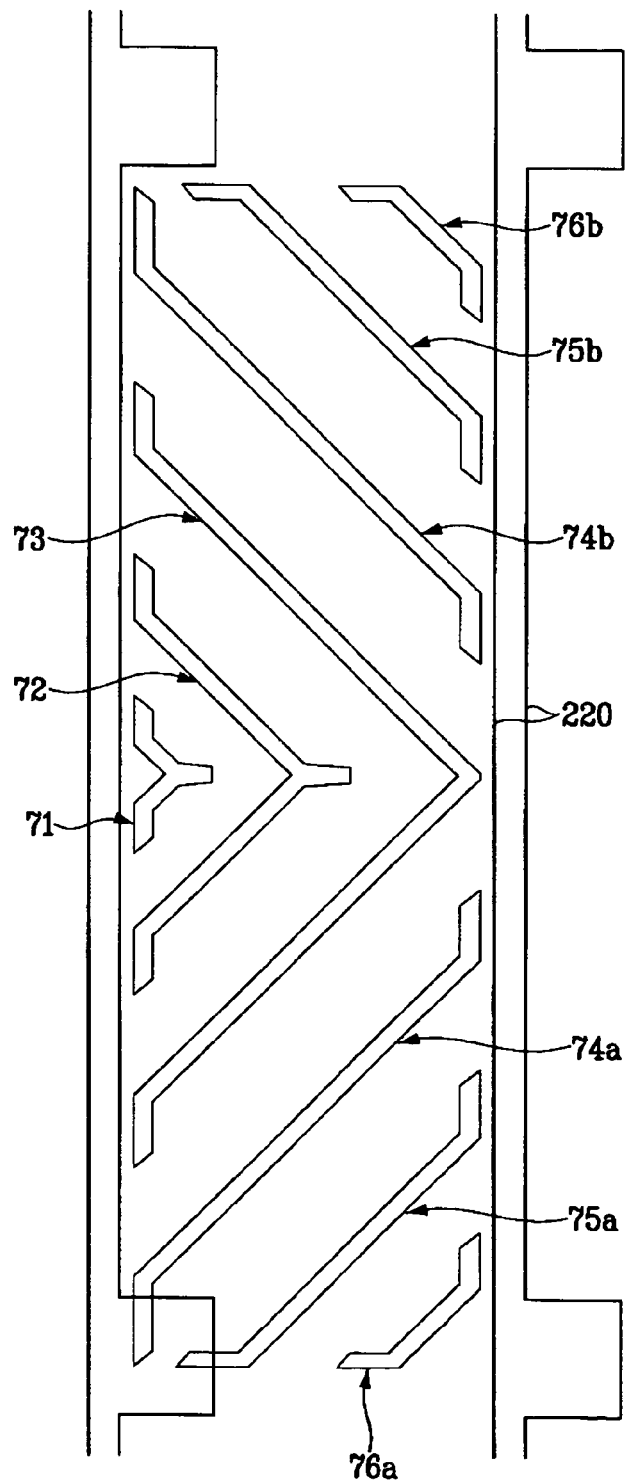
FIG. 2 is a layout view of a common electrode panel of an LCD according to an embodiment of the present invention.
Figure 3:
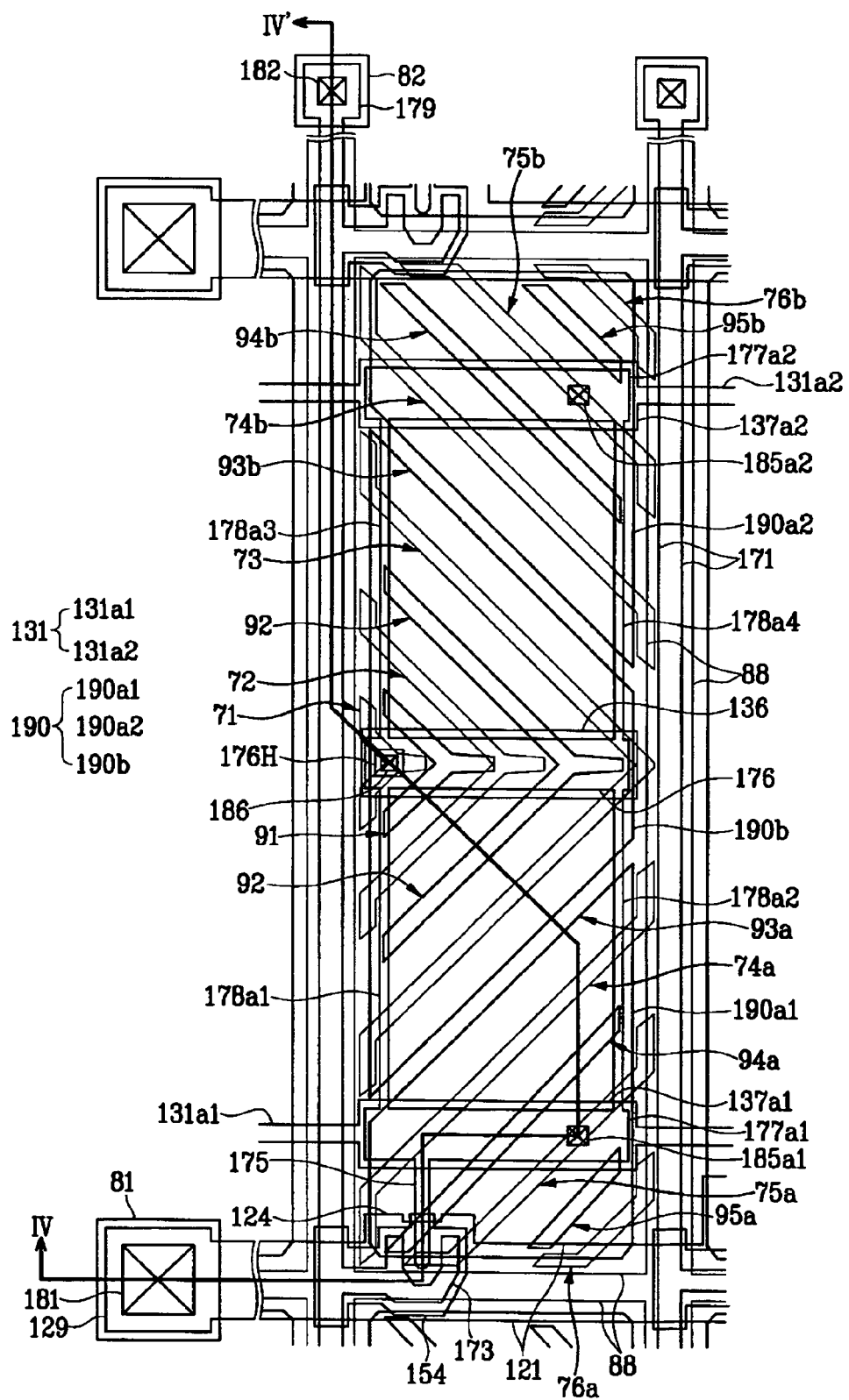
FIG. 3 is a layout view of an LCD including the TFT array panel shown in FIG. 1 and the common electrode panel shown in FIG. 2.
Figure 4:
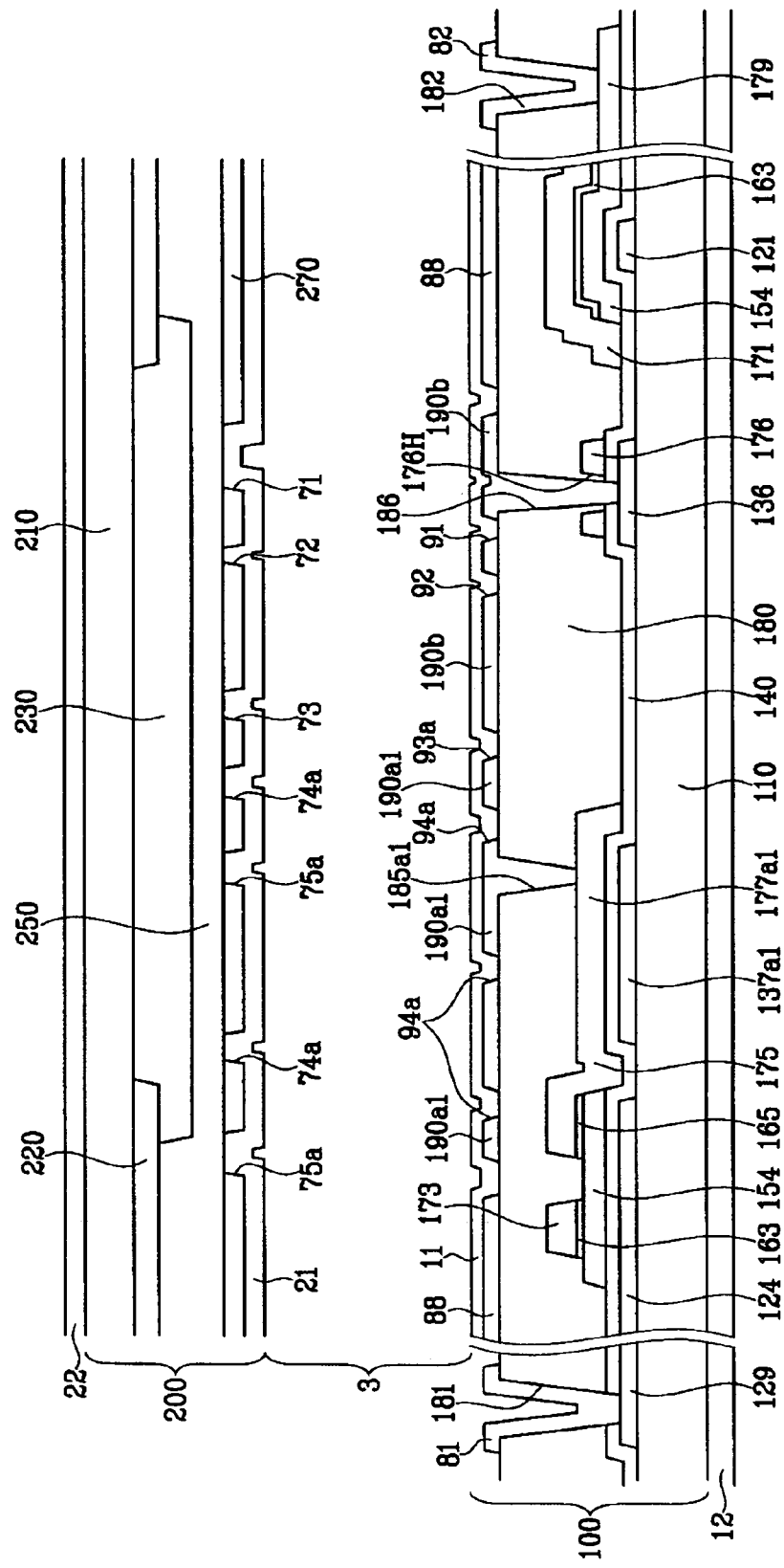
FIG. 4 is a sectional view of the LCD shown in FIG. 3 taken along line IV-IV'.
Figure 5:
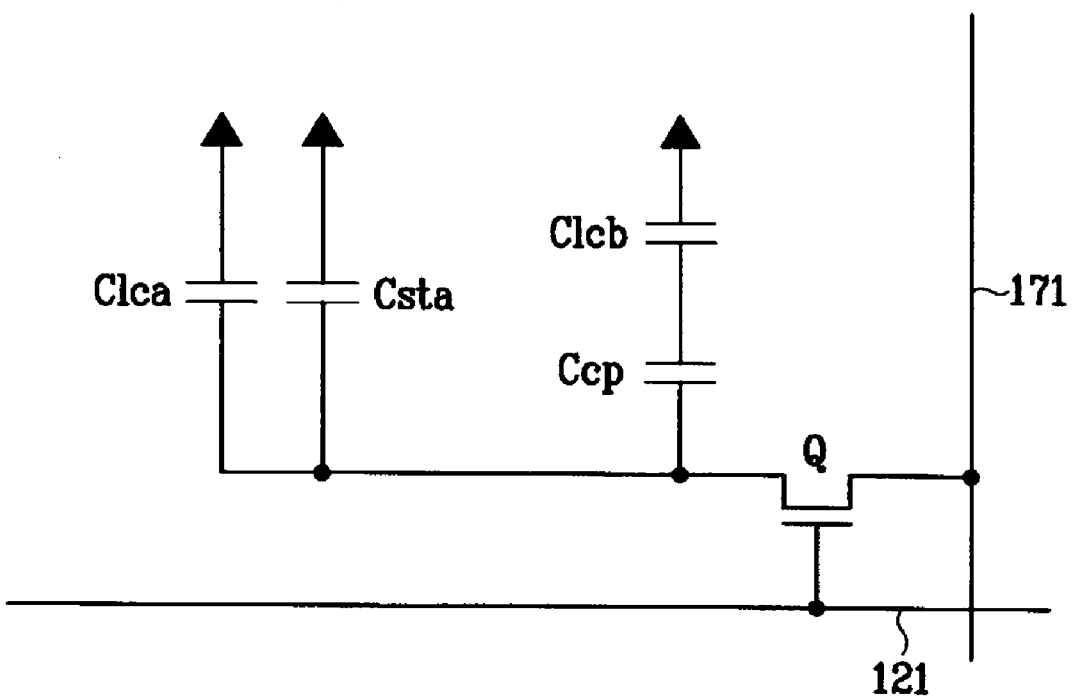
FIG. 5 is an equivalent circuit diagram of the LCD shown in FIG. 14.

An LCD according to an embodiment of the present invention will be described in detail with reference to FIGS. 1-5. FIG. 1 is a layout view of a TFT array panel of an LCD according to an embodiment of the present invention, FIG. 2 is a layout view of a common electrode panel of an LCD according to an embodiment of the present invention, FIG. 3 is a layout view of an LCD including the TFT array panel shown in FIG. 1 and the common electrode panel shown in FIG. 2, FIG. 4 is a sectional view of the LCD shown in FIG. 3 taken along line IV-IV', and FIG. 5 is an equivalent circuit diagram of the LCD shown in FIG. 1-4.

Referring now to FIG. 1-4, an LCD according to an embodiment of the present invention includes a TFT array panel 100, a common electrode panel 200, and a LC layer 3 interposed between the panels 100 and 200. The TFT array panel 100 is now described in detail with reference FIGS. 1, 3 and 4. A plurality of gate conductors including a plurality of gate lines 121, a plurality of storage electrode lines 131, and a plurality of capacitive electrodes 136 are formed on an insulating substrate 110 such as transparent glass or plastic.

The gate lines 121 transmit gate signals and extend substantially in a transverse direction. Each gate line 121 includes a plurality of gate electrodes 124 projecting upward and an end portion 129 having a large area for contact with another layer or an external driving circuit. A gate driving circuit (not shown) for generating the gate signals may be mounted on a flexible printed circuit (FPC) film (not shown), which may be attached to the substrate 110, directly mounted on the substrate 110, or integrated onto the substrate 110. The gate lines 121 may extend to be connected to a driving circuit that may be integrated on the substrate 110.

The storage electrodes 131 are supplied with a predetermined voltage and each of the storage electrodes 131 includes a pair of lower and upper stems 131a1 and 131a2 extending substantially parallel to the gate lines 121. Each of the storage electrode lines 131 is disposed between two adjacent gate lines 121, and the lower and the upper stems 131a1 and 131a2 are disposed close to the lower and upper one of the two adjacent gate lines 121, respectively. The lower and the upper stems 131a1 and 131a2 include lower and upper storage electrodes 137a1 and 137a2, respectively, expanding upward and downward. However, the storage electrode lines 131 may have various shapes and arrangements.

Each of the capacitive electrodes 136 is a rectangle elongated parallel to the gate lines 121 and separated from the gate lines 121 and the storage electrode lines 131. Each of the capacitive electrodes 136 is disposed between a pair of lower and upper storage electrodes 137a1 and 137a2 and it is substantially equidistant from the lower and the upper storage electrodes 137a1 and 137a2 and from the adjacent two gate lines 121. Each of the capacitive electrodes 136 may include a funneled left end portion that has oblique edges making about a 45-degree angle with the gate lines 121.

The gate conductors 121, 131 and 136 are preferably made of aluminum (Al) containing metal such as Al and Al alloy, silver (Ag) containing metal such as Ag and Ag alloy, copper (Cu) containing metal such as Cu and Cu alloy, molybdenum (Mo) containing metal such as Mo and Mo alloy, chromium (Cr), tantalum (Ta), or titanium (Ti). However, they may have a multi-layered structure including two conductive films (not shown) having different physical characteristics. One of the two films is preferably made of low resistivity metal including Al containing metal, Ag containing metal, and Cu containing metal for reducing signal delay or voltage drop. The other film is preferably made of material such as Mo containing metal, Cr, Ta, or Ti, which has good physical, chemical, and electrical contact characteristics with other materials such as indium tin oxide (ITO) or indium zinc oxide (IZO). Good examples of the combination of the two films are a lower Cr film and an upper Al (alloy) film and a lower Al (alloy) film and an upper Mo (alloy) film. However, the gate conductors 121, 131 and 136 may be made of various metals or conductors. The lateral sides of the gate conductors 121, 131 and 136 are inclined relative to a surface of the substrate 110, and the inclination angle thereof ranges from about 30-80 degrees. A gate insulating layer 140 preferably made of silicon nitride (SiNx) or silicon oxide (SiOx) is formed on the gate conductors 121, 131 and 136.

A plurality of semiconductor islands 154 preferably made of hydrogenated amorphous silicon (abbreviated to "a-Si") or polysilicon are formed on the gate insulating layer 140. The semiconductor islands 154 are disposed on the gate electrodes 124 and include extensions covering edges of the gate lines 121. A plurality of other semiconductor islands (not shown) may be disposed on the storage electrode lines 131. A plurality of ohmic contact islands 163 and 165 are formed on the semiconductor stripes (islands) 154. The ohmic contacts 163 and 165 are preferably made of n+ hydrogenated a-Si heavily doped with n type impurity such as phosphorous or they may be made of silicide. The ohmic contacts 163 and 165 are located in pairs on the semiconductor islands 154. The lateral sides of the semiconductor islands 154 and the ohmic contacts 163 and 165 are inclined relative to the surface of the substrate 110, and the inclination angles thereof are preferably in a range of about 30-80 degrees.

A plurality of data conductors including a plurality of data lines 171 and a plurality of drain electrodes 175 are formed on the ohmic contacts 163 and 165 and the gate insulating layer 140. The data lines 171 transmit data signals and extend substantially in the longitudinal direction to intersect the gate lines 121 and the storage electrode lines 131. Each data line 171 includes a plurality of source electrodes 173 projecting toward the gate electrodes 124 and an end portion 179 having a large area for contact with another layer or an external driving circuit. A data driving circuit (not shown) for generating the data signals may be mounted on a FPC film (not shown), which may be attached to the substrate 110, directly mounted on the substrate 110, or integrated onto the substrate 110. The data lines 171 may extend to be connected to a driving circuit that may be integrated on the substrate 110.

Each of the drain electrodes 175 is separated from the data lines 171 and includes an end portion disposed opposite the source electrodes 173 with respect to the gate electrodes 124. The end portion is partly enclosed by a source electrode 173 that is curved like a character U. Each drain electrode 175 further includes lower, upper, and central expansions 177a1, 177a2, and 176 and two pairs of interconnections 178a1, 178a2, 178a3 and 178a4 connecting the expansions 177a1, 177a2, and 176. Each of the expansions 177a1, 177a2, and 176 are a rectangle elongated parallel to the gate lines 121 and the interconnections 178a1-178a4 connect the expansions 177a1, 177a2, and 176 near left and right sides thereof. The lower and upper expansions 177a1 and 177a2 overlap lower and upper storage electrodes 137a1 and 137a2, respectively. The central expansion 176 overlaps a capacitive electrode 136 and it is referred to as a "coupling electrode." The coupling electrode 176 has a through-hole 176H exposing a top surface of the gate insulating layer 140 near a left end portion and it has nearly the same shape as the capacitive electrode 136. The interconnections 178a1-178a4 are disposed adjacent to the data lines 171 and extend substantially in parallel to the data lines 171. The interconnections 178a1-178a4 left and right to a data line 171 are disposed symmetrical to the data line 171 such that the parasitic capacitance between the data line 171 and the interconnections 178a1-178a4 left thereto is substantially the same as that between the data line 171 and the interconnections 178a1-178a4 right thereto. Accordingly, the generation of so-called stains in a LCD screen caused by the difference in the parasitic capacitance is prevented, thereby improving image quality. In addition, the multi-connections between adjacent expansions 177a1 and 176, or 176 and 177a2 prevent the disconnection therebetween.

A gate electrode 124, a source electrode 173, and a drain electrode 175 along with a semiconductor island 154 form a TFT having a channel formed in the semiconductor island 154 disposed between the source electrode 173 and the drain electrode 175. The data conductors 171 and 175 are preferably made of refractory metal such as Cr, Mo, Ta, Ti, or alloys thereof. However, they may have a multilayered structure including a refractory metal film (not shown) and a low resistivity film (not shown). Good examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data conductors 171 and 175 may be made of various metals or conductors. The data conductors 171 and 175 have inclined edge profiles, and the inclination angles thereof range from about 30-80 degrees.

The ohmic contacts 163 and 165 are interposed only between the underlying semiconductor islands 154 and the overlying data conductors 171 and 175 thereon and reduce the contact resistance therebetween. The extensions of the semiconductor islands 154 disposed on the edges of the gate lines 121 smooth the profile of the surface to prevent the disconnection of the data lines 171 there. The semiconductor islands 154 include some exposed portions, which are not covered with the data conductors 171 and 175, such as portions located between the source electrodes 173 and the drain electrodes 175.

A passivation layer 180 is formed on the data conductors 171 and 175, and the exposed portions of the semiconductor islands 154. The passivation layer 180 is preferably made of either inorganic or organic insulator and may have a flat surface. Examples of inorganic insulators include silicon nitride and silicon oxide. The organic insulator may have photosensitivity and it preferably has a dielectric constant of less than about 4.0. The passivation layer 180 may include a lower film of inorganic insulator and an upper film of organic insulator such that it takes the excellent insulating characteristics of the organic insulator while preventing the exposed portions of the semiconductor islands 154 from being damaged by the organic insulator. The passivation layer 180 has a plurality of contact holes 182 exposing the end portions 179 of the data lines 171 and a plurality of contact holes 185a1 and 185a2 exposing the lower and the upper expansions 177a1 and 177a2 of the drain electrodes 175, respectively. The passivation layer 180 and the gate insulating layer 140 have a plurality of contact holes 181 exposing the end portions 129 of the gate lines 121 and a plurality of contact holes 186 penetrating the through-holes 176H without exposing the coupling electrodes 176 and exposing the end portions of the capacitive electrodes 136. The contact holes 181, 182, 185a1, 185a2 and 186 may have inclined or stepped sidewalls that can be easily obtained by using organic material.

A plurality of pixel electrodes 190, a shielding electrode 88, and a plurality of contact assistants 81 and 82 are formed on the passivation layer 180. They are preferably made of transparent conductor such as ITO or IZO or reflective conductor such as Ag, Al, Cr, or alloys thereof. Each pixel electrode 190 is approximately a rectangle having chamfered corners and the chamfered edges of the pixel electrode 190 make an angle of about 45 degrees with the gate lines 121. The pixel electrodes 190 overlap the gate lines 121 to increase the aperture ratio. Each of the pixel electrodes 190 has lower and upper gaps 93a and 93b that divide the pixel electrode 190 into lower, upper, and central subpixel electrodes 190a1, 190a2 and 190b. The lower and the upper gaps 93a and 93b extend obliquely from a left edge to a right edge of the pixel electrode 190 such that the central subpixel electrode 190b is an isosceles trapezoid rotated by a right angle and the lower and the upper subpixel electrodes 190a1 and 190a2 are right-angled trapezoids rotated by a right angle. The lower and the upper gaps 93a and 93b make an angle of about 45 degrees with the gate lines 121 and they are perpendicular to each other. The lower and the upper subpixel electrodes 190a1 and 190a2 are connected to the lower and the upper expansions 177a1 and 177a2 of the drain electrodes 175 through contact holes 185a1 and 185a2, respectively. The central subpixel electrode 190b is connected to a capacitive electrode 136 through a contact hole 186 and overlaps a coupling electrode 176. The central subpixel electrode 190b, the capacitive electrode 136, and the coupling electrode 176 form a "coupling capacitor."

The central subpixel electrode 190b has central cutouts 91 and 92, the lower subpixel electrode 190a1 has lower cutouts 94a and 95a, and the upper subpixel electrode 190a2 has upper cutouts 94b and 95b. The cutouts 91, 92 and 94a-95b partition the subpixel electrodes 190b, 190a1 and 190a2 into a plurality of partitions. The pixel electrode 190 having the cutouts 91, 92 and 94a-95b and the gaps 93a and 93b (also referred to as cutouts hereinafter) substantially has an inverted symmetry with respect to a capacitive electrode 136. Each of the lower and the upper cutouts 94a-95b obliquely extends approximately from a left corner, a lower edge, or an upper edge of the pixel electrode 190 approximately to a right edge of the pixel electrode 190. The lower and the upper cutouts 94a-95b make an angle of about 45 degrees to the gate lines 121, and they extend substantially perpendicular to each other.

Each of the center cutouts 91 and 92 includes a transverse portion and a pair of oblique portions connected thereto. The transverse portion shortly extends along the capacitive electrode 136, and the oblique portions obliquely extend from the transverse portion toward the left edge of the pixel electrode 190 in parallel to the lower and the upper cutouts 94a-95b, respectively. The number of the cutouts or the number of the partitions varies depending on the design factors such as the size of the pixel electrode 190, the ratio of the transverse edges and the longitudinal edges of the pixel electrode 190, the type and characteristics of the liquid crystal layer 3, and so on.

The shielding electrode 88 is supplied with the common voltage and it includes longitudinal portions extending along the data lines 171 and transverse portions extending along the gate lines 127 to connect adjacent longitudinal portions. The longitudinal portions fully cover the data lines 171, while each of the transverse portions lies within the boundary of a gate line 121. The shielding electrode 88 blocks electromagnetic interference between the data lines 171 and the pixel electrodes 190 and between the data lines 171 and the common electrode 270 to reduce the distortion of the voltage of the pixel electrodes 190 and the signal delay of the data voltages carried by the data lines 171. The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

The description of the common electrode panel 200 follows with reference to FIG. 24. A light blocking member 220 referred to as a black matrix for preventing light leakage is formed on an insulating substrate 210 such as transparent glass or plastic. The light blocking member 220 include a plurality of rectilinear portion facing the data lines 171 on the TFT array panel 100 and a plurality of widened portions facing the TFTs on the TFT array panel 100. Otherwise, the light blocking member 220 may have a plurality of through-holes that face the pixel electrodes 190 and it may have substantially the same planar shape as the pixel electrodes 190.

A plurality of color filters 230 are also formed on the substrate 210 and they are disposed substantially in the areas enclosed by the light blocking member 220. The color filters 230 may extend substantially along the longitudinal direction along the pixel electrodes 190. The color filters 230 may represent one of the primary colors such as red, green and blue colors. An overcoat 250 is formed on the color filters 230 and the light blocking member 220. The overcoat 250 is preferably made of (organic) insulator and it prevents the color filters 230 from being exposed and provides a flat surface. A common electrode 270 is formed on the overcoat 250. The common electrode 270 is preferably made of transparent conductive material such as ITO and IZO and has a plurality of sets of cutouts 71, 72, 73, 74a, 74b, 75a, 75b, 76a and 76b.

A set of cutouts 71-76b face a pixel electrode 190 and include center cutouts 71, 72 and 73, lower cutout 74a, 75a and 76a and upper cutouts 74b, 75b and 76b. The cutout 71 is disposed near the contact hole 186 and each of the cutouts 72-76b is disposed between adjacent cutouts 91-95b of the pixel electrode 190 or between a cutout 95a or 95b and a chamfered edge of the pixel electrode 190. Each of the cutouts 71-76b has at least an oblique portion extending parallel to the lower cutout 93a-95a or the upper cutout 93b-95b of the pixel electrode 190. The cutouts 71-76b have substantially an inverted symmetry with respect to a capacitive electrode 136.

Each of the lower and the upper cutouts 74a-76b includes an oblique portion and a pair of transverse and longitudinal portions or a pair of longitudinal portions. The oblique portion extends approximately from a left edge, a lower edge, or an upper edge of the pixel electrode 190 approximately to a right edge of the pixel electrode 190. The transverse and longitudinal portions extend from respective ends of the oblique portion along edges of the pixel electrode 190, overlapping the edges of the pixel electrode 190, and making obtuse angles with the oblique portion.

Each of the center cutouts 71 and 72 includes a central transverse portion, a pair of oblique portions, and a pair of terminal longitudinal portions and the center cutout 73 includes a pair of oblique portions and a pair of terminal longitudinal portions. The central transverse portion is disposed near the left edge or a center of the pixel electrode 190 and extends along the capacitive electrode 136. The oblique portions extend from an end of the central transverse portion or approximately from a center of the right edge of the pixel electrode 190, approximately to the left edge of the pixel electrode. The oblique portions of the cutouts 71 and 72 make oblique angles with the central transverse portion. The terminal longitudinal portions extend from the ends of the respective oblique portions along the left edge of the pixel electrode 190, overlapping the left edge of the pixel electrode 190, and making obtuse angles with the respective oblique portions. The number of the cutouts 71-76b may vary depending on the design factors, and the light blocking member 220 may overlap the cutouts 71-76b to block the light leakage through the cutouts 71-76b.

Alignment layers 11 and 21 may be homeotropic and are coated on the inner surfaces of the panels 100 and 200. Polarizers 12 and 22 are provided on outer surfaces of the panels 100 and 200 so that their polarization axes may cross and one of the polarization axes may be parallel to the gate lines 121. One of the polarizers 12 and 22 may be omitted when the LCD is a reflective LCD. The LCD may further include at least one retardation film (not shown) to for compensate for the retardation of the LC layer 3. The retardation film has birefringence and gives a retardation opposite to that given by the LC layer 3.

The LCD may further include a backlight unit (not shown) supplying light to the LC layer 3 through the polarizers 12 and 22, the retardation film, and the panels 100 and 200. It is preferable that the LC layer 3 has negative dielectric anisotropy and it is subjected to a vertical alignment that the LC molecules in the LC layer 3 are aligned such that their long axes are substantially vertical to the surfaces of the panels 100 and 200 in the absence of an electric field. Accordingly, incident light cannot pass the crossed polarization system 12 and 22.

The opaque members such as the storage electrode lines 131, the capacitive electrodes 136, and the expansions 177a1, 177a2 and 176 and the interconnections 178a1-178a4 of the drain electrodes 175, and the transparent members such as the pixel electrodes 190 having the cutouts 91-95b and 71-76b are symmetrically arranged with respect to the capacitive electrodes 136 that are equidistant from adjacent gate lines 121. At this time, since the interconnections 178a1-178a4 are disposed near the edges of the pixel electrodes 190, they do not decrease the light transmissive areas, but rather block the texture generated near the light transmissive areas. The interconnections 178a1-178a4 are spaced apart from the data lines 171 by preferably about less than 42 microns.

The LCD shown in FIGS. 1-4 is represented as an equivalent circuit shown in FIG. 5. Referring now to FIG. 5, a pixel of the LCD includes a TFT Q, a first subpixel including a first LC capacitor Clca and a storage capacitor Csta, a second subpixel including a second LC capacitor Clcb, and a coupling capacitor Ccp. The first LC capacitor Clca includes lower and upper subpixel electrodes 190a1 and 190a2 as one terminal, a portion of the common electrode 270 corresponding thereto as the other terminal, and a portion of the LC layer 3 disposed therebetween as a dielectric. Similarly, the second LC capacitor Clcb includes a central subpixel electrode 190b as one terminal, a portion of the common electrode 270 corresponding thereto as the other terminal, and a portion of the LC layer 3 disposed thereon as a dielectric.

The storage capacitor Csta includes lower and upper expansions 177a1 and 177a2 of a drain electrode 175 as one terminal, lower and upper storage electrodes 137a1 and 137a2 as the other terminal, and a portion of the gate insulating layer 140 disposed therebetween as a dielectric. The coupling capacitor Ccp includes a central subpixel electrode 190b and a capacitive electrode 136 as one terminal, a coupling electrode 176 as the other terminal, and portions of the passivation layer 180 and the gate insulating layer 140 disposed therebetween as a dielectric. The first LC capacitor Clca and the storage capacitor Csta are connected in parallel to a drain of the TFT Q. The coupling capacitor Ccp is connected between the drain of the TFT Q and the second LC capacitor Clcb. The common electrode 270 is supplied with a common voltage Vcom and the storage electrode lines 131 may be supplied with the common voltage Vcom.

The TFT Q applies data voltages from a data line 171 to the first LC capacitor Clca and the coupling capacitor Ccp in response to a gate signal from a gate line 121, and the coupling capacitor Ccp transmits the data voltage with a modified magnitude to the second LC capacitor Clcb. If the storage electrode line 131 is supplied with the common voltage Vcom and each of the capacitors Clca, Csta, Clcb and Ccp and the capacitance thereof are denoted as the same reference characters, the voltage Vb charged across the second LC capacitor Clcb is given by:

$$Vb=Va \times [Ccp/(Ccp+Clcb)],$$

where Va denotes the voltage of the first LC capacitor Clca.

Since the term Ccp/(Ccp+Clcb) is smaller than one, the voltage Vb of the second LC capacitor Clcb is greater than that of the first LC capacitor Clca. This inequality may also be true for a case where the voltage of the storage electrode line 131 is not equal to the common voltage Vcom.

When the potential difference is generated across the first LC capacitor Clca or the second LC capacitor Clcb, an electric field substantially perpendicular to the surfaces of the panels 100 and 200 is generated in the LC layer 3 and both the pixel electrode 190 and the common electrode 270 are commonly referred to as field generating electrodes hereinafter. Then, the LC molecules in the LC layer 3 tilt in response to the electric field such that their long axes are perpendicular to the field direction. The degree of the tilt of the LC molecules determines the variation of the polarization of light incident on the LC layer 3 and the variation of the light polarization is transformed into the variation of the light transmittance by the polarizers 12 and 22. In this way, the LCD displays images.

The tilt angle of the LC molecules depends on the strength of the electric field. Since the voltage Va of the first LC capacitor Clca and the voltage Va of the second LC capacitor Clcb are different from each other, the tilt direction of the LC molecules in the first subpixel is different from that in the second subpixel and thus the luminances of the two subpixels are different. Accordingly, with maintaining the average luminance of the two subpixels in a target luminance, the voltages Va and Vb of the first and the second subpixels can be adjusted so that an image viewed from a lateral side is the closest to an image viewed from the front, thereby improving the lateral visibility.

The ratio of the voltages Va and Vb can be adjusted by varying the capacitance of the coupling capacitor Ccp, and the coupling capacitance Ccp can be varied by changing the overlapping area and distance between the coupling electrode 176 and the central subpixel electrode 190b (and the capacitive electrode 136). For example, the distance between the coupling electrode 177b and the central subpixel electrode 190b becomes large when the capacitive electrode 136 is removed and the coupling electrode 176 is moved to the position of the capacitive electrode 136. Preferably, the voltage Vb of the second LC capacitor Clcb is from about 0.6 to about 0.8 times the voltage Va of the first LC capacitor Clca. The voltage Vb on (charged in) the second LC capacitor Clcb may be larger than the voltage Va of the first LC capacitor Clca. This can be realized by precharging the second LC capacitor Clcb with a predetermined voltage such as the common voltage Vcom. The ratio of the lower and the upper subpixel electrodes 190a1 and 190a2 of the first subpixel and the central subpixel electrode 190b of the second subpixel is preferably from about 1:0.85 to about 1:1.15 and the number of the subpixel electrodes in each of the LC capacitors Clca and Clcb may be changed.

The tilt direction of the LC molecules is determined by a horizontal component generated by the cutouts 91-95b and 71-76b of the field generating electrodes 190 and 270 and the oblique edges of the pixel electrodes 190 distorting the electric field, which is substantially perpendicular to the edges of the cutouts 91-95b and 71-76b and the oblique edges of the pixel electrodes 190. Referring to FIG. 3, a set of the cutouts 91-95b and 71-76b divides a pixel electrode 190 into a plurality of sub-areas and each sub-area has two major edges. Since the LC molecules on each sub-area tilt perpendicular to the major edges, the azimuthal distribution of the tilt directions are localized to four directions, thereby increasing the reference viewing angle of the LCD. In addition, when the areas that can transmit light for the above-described four tilt directions are the same, the visibility becomes better for various viewing directions. Since the opaque members are symmetrically arranged as described above, the adjustment of the transmissive areas is easy.

The shapes and the arrangements of the cutouts 91-95b and 71-76b for determining the tilt directions of the LC molecules may be modified and at least one of the cutouts 91-95b and 71-76b can be substituted with protrusions (not shown) or depressions (not shown). The protrusions are preferably made of organic or inorganic material and disposed on or under the field-generating electrodes 190 or 270. In the meantime, since there is no electric field between the shielding electrode 88 and the common electrode 270, the LC molecules on the shielding electrode 88 remain their initial orientations and thus the light incident thereon is blocked. Accordingly, the shielding electrode 88 may serve as a light blocking member and the light blocking member 220 may be omitted.

Figure 6:
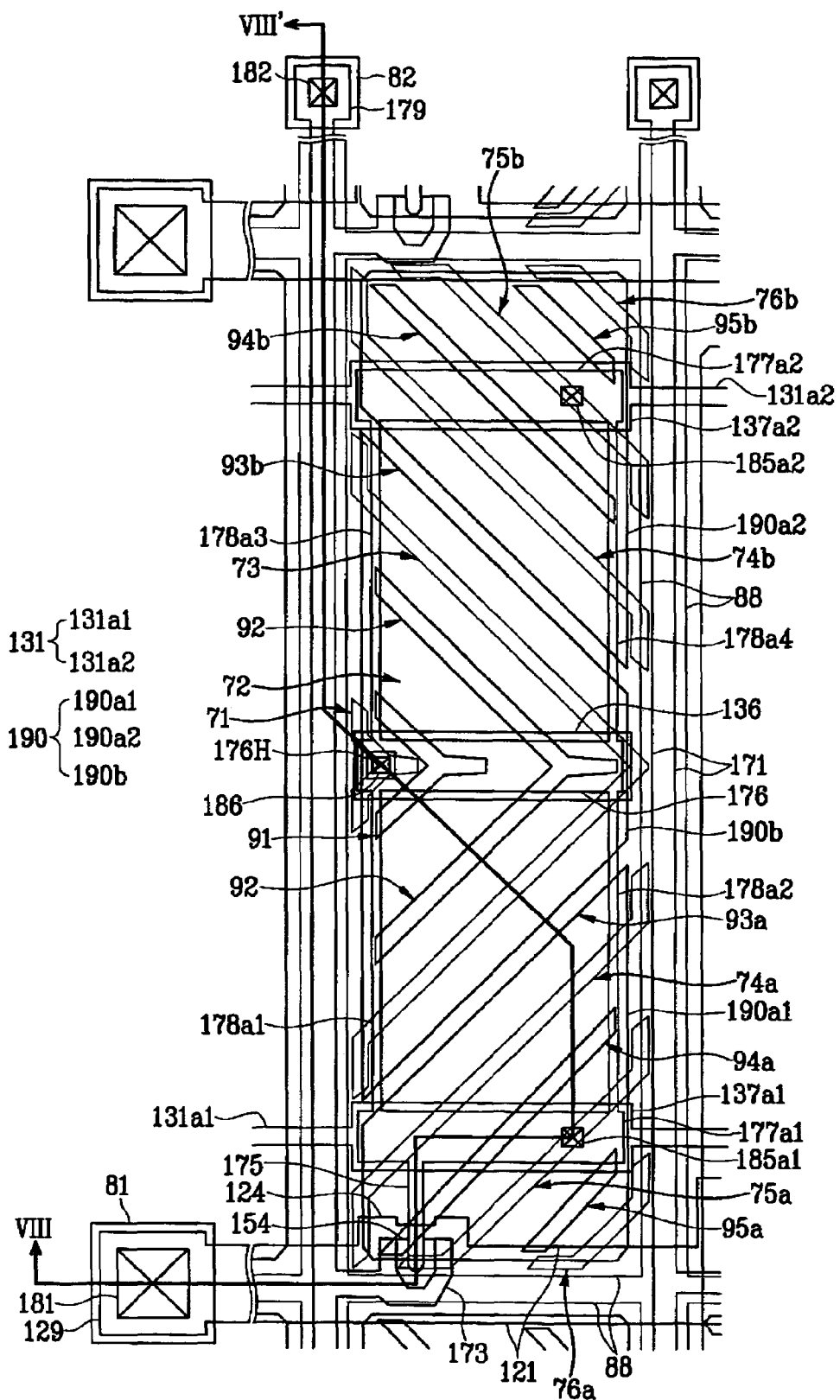
FIG. 6 is a layout view of an LCD according to another embodiment of the present invention.
Figure 7:
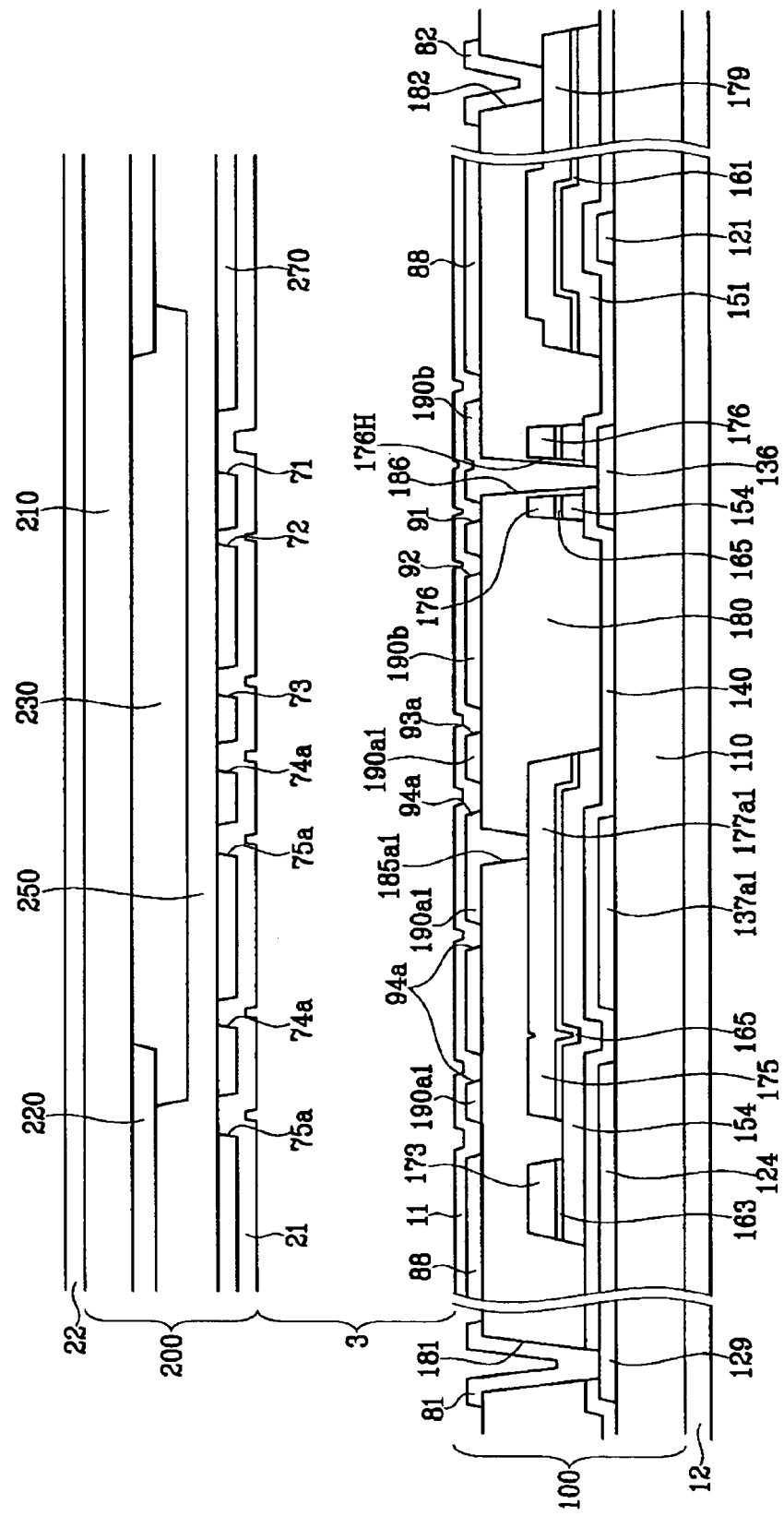
FIG. 7 is a sectional view of the LCD shown in FIG. 6 taken along the line VII-VII'.

An LCD according to another embodiment of the present invention will be described in detail with reference to FIGS. 6 and 7. FIG. 6 is a layout view of an LCD according to another embodiment of the present invention, and FIG. 7 is a sectional view of the LCD shown in FIG. 6 taken along the line VII-VII'. Referring now to FIGS. 6 and 7, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200. Layered structures of the panels 100 and 200 according to this embodiment are almost the same as those shown in FIGS. 1-4.

Regarding the TFT array panel 100, a plurality of gate lines 121 including gate electrodes 124 and end portions 129, a plurality of storage electrode lines 131 including stems 131a1 and 131a2 and storage electrodes 137a1 and 137a2, and a plurality of capacitive electrodes 136 are formed on a substrate 110. A gate insulating layer 140, a plurality of semiconductors 154, and a plurality of ohmic contacts 163 and 165 are sequentially formed on the gate lines 121 and the storage electrodes lines 131. A plurality of data lines 171 including source electrodes 173 and end portions 179 and a plurality of drain electrodes 175 including expansions 177a1, 177a2 and 176 and interconnections 178a1-178a4 are formed on the ohmic contacts 163 and 165. A passivation layer 180 is formed on the data lines 171, the drain electrodes 175, and exposed portions of the semiconductors 154. A plurality of contact holes 181, 182, 185a1, 185a2 and 186 are provided at the passivation layer 180 and the gate insulating layer 140 and the contact holes 186 pass through through-holes 176H provided at the expansions 176 of the drain electrodes 175. A plurality of pixel electrodes 190 including subpixel electrodes 190*a*1, 190*a*2 and 190*b* and having cutouts 91-95*b*, a shielding electrode 88, and a plurality of contact assistants 81 and 82 are formed on the passivation layer 180, and an alignment layer 11 is coated thereon. Regarding the common electrode panel 200, a light blocking member 220, a plurality of color filters 230, an overcoat 250, a common electrode 270 having cutouts 71-76*b*, and an alignment layer 21 are formed on an insulating substrate 210.

Different from the LCD shown in FIGS. 1-4, the semiconductors 154 and the ohmic contacts 163 of the TFT array panel 100 according to this embodiment extend along the data lines 171 to form semiconductor stripes 151 and ohmic contact stripes 161. In addition, the semiconductor stripes 154 have almost the same planar shapes as the data lines 171 and the drain electrodes 175 as well as the underlying ohmic contacts 163 and 165. However, the semiconductors 154 include some exposed portions, which are not covered with the data lines 171 and the drain electrodes 175, such as portions located between the source electrodes 173 and the drain electrodes 175. In addition, each of the capacitive electrodes 136 has four branches overlapping the interconnections 178*a*1-178*a*4 of a drain electrode 175 to increase the coupling capacitance. Otherwise, the stems 131*a*1 and 131*a*2 may have branches overlapping the interconnections 178*a*1-178*a*4 of a drain electrode 175 to increase the storage capacitance.

A manufacturing method of the TFT array panel according to an embodiment simultaneously forms the data lines 171 and the drain electrodes 175, the semiconductors 151, and the ohmic contacts 161 and 165 using one photolithography step. A photoresist masking pattern for the photolithography process has position-dependent thickness, and in particular, it has thicker portions and thinner portions. The thicker portions are located on wire areas that will be occupied by the data lines 171 and the drain electrodes 175, and the thinner portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer (source) used for the photolithography. Another example is to use reflowable photoresist. In more detail, once a photoresist pattern made of a reflowable material is formed by using a normal exposure mask only with transparent areas and opaque areas, it is subject to reflow process to flow onto areas without the photoresist, thereby forming thin portions. As a result, the manufacturing process is simplified by omitting a photolithography step. Many of the above-described features of the LCD shown in FIGS. 1-4 may be appropriate to the LCD shown in FIGS. 6 and 7.

Figure 8:
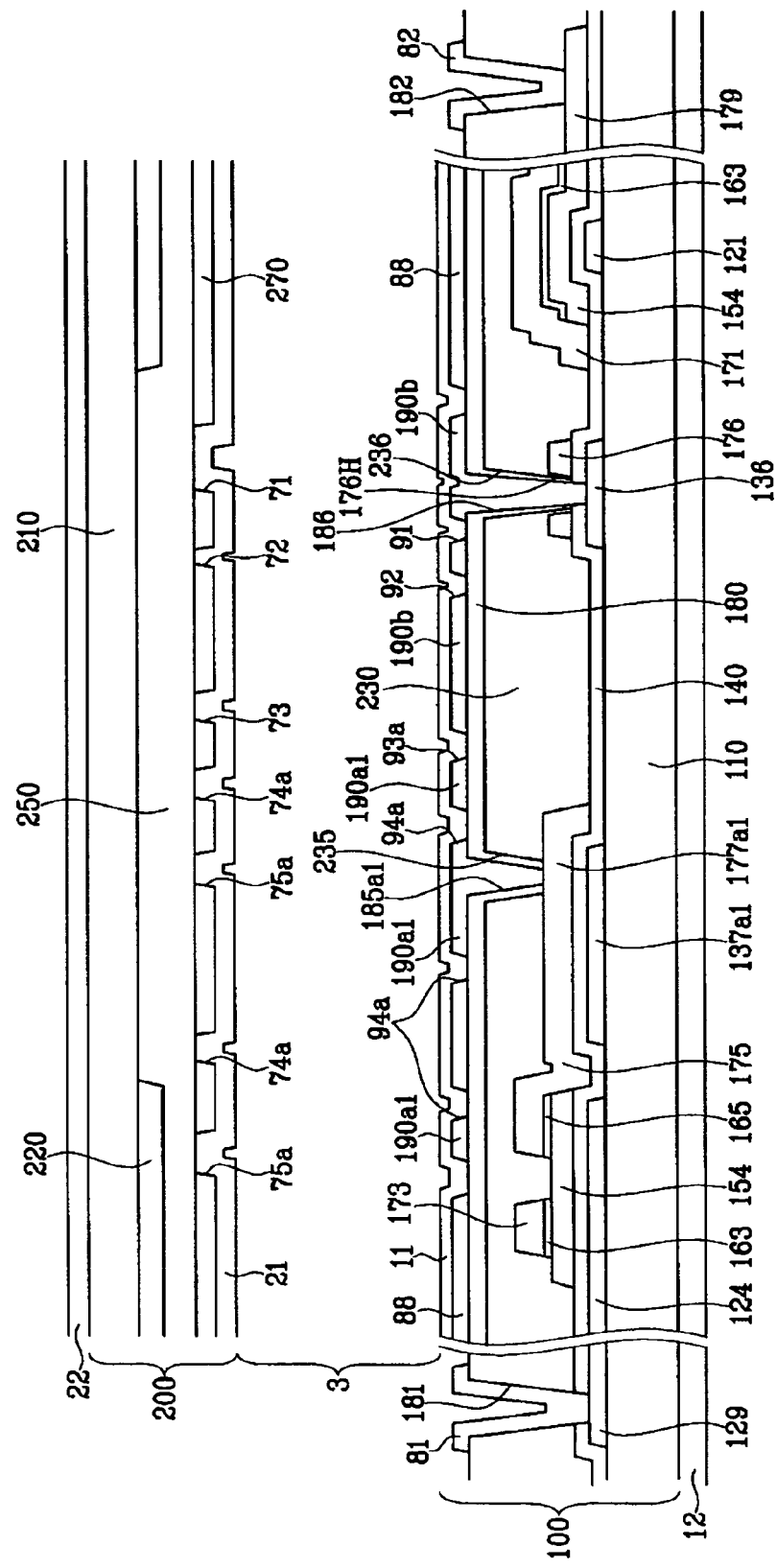
FIG. 8 is a sectional view of the LCD shown in FIG. 3 taken along the line IV-IV'.

An LCD according to another embodiment of the present invention will be described in detail with reference to FIG. 8. FIG. 8 is a sectional view of the LCD shown in FIG. 3 taken along the line IV-IV'. Referring now to FIG. 8, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200. Layered structures of the panels 100 and 200 according to this embodiment are almost the same as those shown in FIGS. 1-4.

Regarding the TFT array panel 100, a plurality of gate lines 121 including gate electrodes 124 and end portions 129, a plurality of storage electrode lines 131 including stems 131*a*1 and 131*a*2 and storage electrodes 137*a*1 and 137*a*2, and a plurality of capacitive electrodes 136 are formed on a substrate 110. A gate insulating layer 140, a plurality of semiconductors 154, and a plurality of ohmic contacts 163 and 165 are sequentially formed on the gate lines 121 and the storage electrodes lines 131. A plurality of data lines 171 including source electrodes 173 and end portions 179 and a plurality of drain electrodes 175 including expansions 177*a*1, 177*a*2 and 176 and interconnections 178*a*1-178*a*4 are formed on the ohmic contacts 163 and 165 and the gate insulating layer 140. A passivation layer 180 is formed on the data lines 171, the drain electrodes 175, and exposed portions of the semiconductors 154. A plurality of contact holes 181, 182, 185*a*1, 185*a*2 and 186 are provided at the passivation layer 180 and the gate insulating layer 140 and the contact holes 186 pass through through-holes 176H provided at the expansions 176 of the drain electrodes 175. A plurality of pixel electrodes 190 including subpixel electrodes 190*a*1, 190*a*2 and 190*b* and having cutouts 91-95*b*, a shielding electrode 88, and a plurality of contact assistants 81 and 82 are formed on the passivation layer 180, and an alignment layer 11 is coated thereon. Regarding the common electrode panel 200, a light blocking member 220, an overcoat 250, a common electrode 270 having cutouts 71-76*b*, and an alignment layer 21 are formed on an insulating substrate 210.

Different from the LCD shown in FIG. 1-4, the TFT array panel 100 includes a plurality of color filters 230 disposed under the passivation layer 180, while the common electrode panel 200 has no color filter. In this case, the overcoat 250 may be removed from the common electrode panel 200. The color filters 230 are disposed between two adjacent data lines 171 and they have a plurality of through-holes 235 and 236 through which the contact holes 185 and 186 pass through, respectively. The color filters 230 are not provided on peripheral areas provided with the end portions 129 and 179 of the signal lines 121 and 171. The color filters 230 may extend along a longitudinal direction to form stripes and the edges of adjacent two of the color filters 230 may exactly match with each other on the data lines 171. However, the color filters 230 may overlap each other to block the light leakage between the pixel electrodes 190, or may be spaced apart from each other. When the color filters 230 overlap each other, linear portions of the light blocking member 220 may be omitted and in this case, the shielding electrode 88 may cover edges of the color filters 230. Overlapping portions of the color filters 230 may have a reduced thickness to decrease the height difference. Many of the above-described features of the LCD shown in FIG. 14 may be appropriate to the LCD shown in FIG. 8.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display, comprising:
    a first substrate;
    a gate line formed on the first substrate;
    a first capacitor electrode formed on the substrate and separated from the gate line;
    a data line intersecting the gate line;
    a thin film transistor connected to the gate line and the data line;
    a second capacitor electrode disposed on the first capacitor electrode;
    a plurality of first electrodes connected to the second capacitor electrode and the thin film transistor and disposed substantially symmetrical to the data line;

a pixel electrode including at least one first subpixel electrode connected to the thin film transistor and a second subpixel electrode connected to the first capacitor electrode;

a second substrate facing the first substrate; and a common electrode formed on the second substrate.

2. The liquid crystal display of claim 1, wherein the first electrode is substantially parallel with the date line and the distance between the first electrode and the data line is smaller than about 42 microns.

3. The liquid crystal display of claim 2, further comprising:

at least one structural member connected to the thin film transistor; and at least one storage electrode overlapping the at least one structural member.

4. The liquid crystal display of claim 3, wherein the at least one first subpixel electrode comprises a third subpixel electrode and a fourth subpixel electrode.

5. The liquid crystal display of claim 4, wherein the at least one structural member comprises first and second structural members connected to the third and the fourth subpixel electrodes, respectively, and disposed substantially symmetrical to a reference line bisecting the pixel electrode and extending parallel to the gate line.

6. The liquid crystal display of claim 5, wherein the at least one storage electrode comprises first and second storage electrodes overlapping the first and the second structural members, respectively.

7. The liquid crystal display of claim 6, wherein the first electrodes are disposed substantially symmetrical to the reference line.

8. The liquid crystal display of claim 5, wherein the pixel electrode is substantially symmetrical to the reference line.

9. The liquid crystal display of claim 2, wherein the pixel electrode overlaps the first electrodes.

10. The liquid crystal display of claim 2, wherein the first electrodes overlap the first capacitor electrode.

11. The liquid crystal display of claim 1, wherein the second capacitor electrode has a through-hole, and the second subpixel electrode and the first capacitor electrode are connected to each other through the through-hole.

12. The liquid crystal display of claim 1, wherein one of the first capacitor electrode and the second capacitor electrode is disposed substantially symmetrical to a reference line bisecting the pixel electrode and parallel to the gate line.

13. The liquid crystal display of claim 1, further comprising a shielding electrode separated from the pixel electrode and overlapping a predetermined portion of one of the data line and the gate line.

14. The liquid crystal display of claim 13, wherein the pixel electrode and the shielding electrode comprise the same layer.

15. The liquid crystal display of claim 14, wherein the shielding electrode extends along one of the data line and the gate line.

16. The liquid crystal display of claim 15, wherein the shielding electrode fully covers the data line.

17. The liquid crystal display of claim 1, wherein at least one of the first subpixel electrode and the second subpixel electrode has a partitioning member for partitioning the pixel electrode into a plurality of domains.

18. The liquid crystal display of claim 17, wherein the partitioning member is elongated and is disposed at an angle of about 45 degrees with the gate line.

19. The liquid crystal display of claim 1, wherein the pixel electrode overlaps the first electrodes.

20. The liquid crystal display of claim 1, wherein the first electrodes overlap the first electrode.

* * * * *